(12) United States Patent
Anantharaju

(10) Patent No.: US 11,811,827 B2
(45) Date of Patent: Nov. 7, 2023

(54) SECURING ENDPOINTS FOR VIRTUAL MEETINGS

(71) Applicant: Oracle International Corporation, Redwood Shores, CA (US)

(72) Inventor: Girish Anantharaju, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 168 days.

(21) Appl. No.: 17/160,753

(22) Filed: Jan. 28, 2021

(65) Prior Publication Data

US 2022/0239698 A1 Jul. 28, 2022

(51) Int. Cl.
| | | |
|---|---|---|
| *H04L 29/06* | (2006.01) | |
| *H04L 9/40* | (2022.01) | |
| *G06N 20/00* | (2019.01) | |
| *H04L 67/141* | (2022.01) | |
| *G06F 18/214* | (2023.01) | |

(52) U.S. Cl.
CPC .......... *H04L 63/20* (2013.01); *G06F 18/214* (2023.01); *G06N 20/00* (2019.01); *H04L 63/0876* (2013.01); *H04L 63/105* (2013.01); *H04L 67/141* (2013.01)

(58) Field of Classification Search
CPC ... H04L 63/20; H04L 63/0876; H04L 63/105; H04L 63/101; H04L 63/0263; G06F 21/305

USPC .......................................................... 726/4
See application file for complete search history.

(56) References Cited

U.S. PATENT DOCUMENTS

| | | | | |
|---|---|---|---|---|
| 7,675,933 | B2 * | 3/2010 | Prasad ................... | H04W 88/06 370/465 |
| 7,849,206 | B2 * | 12/2010 | Thomas ............... | G06Q 10/107 709/224 |
| 8,181,033 | B1 * | 5/2012 | Paul ..................... | H04L 63/1416 726/28 |
| 10,395,025 | B1 * | 8/2019 | Mabey ................... | G06F 21/31 |
| 10,904,171 | B2 * | 1/2021 | Allen ....................... | H04L 51/04 |
| 11,012,429 | B2 * | 5/2021 | Dhanabalan ........ | H04L 63/0478 |
| 2017/0208296 | A1 * | 7/2017 | Diep ..................... | H04W 76/11 |
| 2022/0230177 | A1 * | 7/2022 | Krushell .............. | G06Q 10/101 |

* cited by examiner

*Primary Examiner* — Longbit Chai
(74) *Attorney, Agent, or Firm* — Invoke

(57) ABSTRACT

Techniques are disclosed for establishing a level of security for a virtual meeting similar to a level of security associated with in person meetings. A communication system may use an application programming interface (API) of an operating system to secure the device by terminating any applications or processes operating on the computing device that are not consistent with a security policy. The system may also use machine learning techniques to monitor audio and/or video streams for participant behaviors that are not consistent with a security policy.

23 Claims, 7 Drawing Sheets

SECURING ENDPOINTS FOR VIRTUAL MEETINGS

TECHNICAL FIELD

The present disclosure relates to virtual meetings. In particular, the present disclosure relates to securing the systems and physical environments used to conduct virtual meetings.

BACKGROUND

Meetings conducted by audio and/or audio-visual communication applications ("virtual meetings") are convenient because they enable face to face communication between colleagues without the inconvenience of travel. This is particularly true for business meetings, for which travel is expensive both in terms of the direct financial costs and the productivity lost while workers are traveling.

While convenient and inexpensive, virtual meetings are less secure than in-person meetings. In-person meetings are generally conducted at a private location where the environment and the attendance may be controlled. In contrast, participants in a virtual meeting may attend a virtual meeting from anywhere with an internet connection, whether a coffee shop, a home, or a vacation destination. These non-business locations may lack the physical controls in place at designated business locations. For example, business locations usually restrict access to only those with the proper permissions, unlike most non-business locations which may have unrestricted access.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. SECURING A COMMUNICATION SESSION PRIOR TO INITIATION
4. MONITORING A COMMUNICATION SESSION TO MAINTAIN A SECURE ENVIRONMENT
5. EXAMPLE EMBODIMENT
6. COMPUTER NETWORKS AND CLOUD NETWORKS
7. MISCELLANEOUS; EXTENSIONS
8. HARDWARE OVERVIEW

1. General Overview

One or more embodiments establish a level of security for communications conducted by an internet-enabled communication application (a "virtual meeting"). This security level enabled for virtual meetings may be comparable with a security level more typically associated with an in-person meeting. In some embodiments, a system may detect a request to initiate a communication session via a communication application. In response to detecting the request, the system secures the device via an application programming interface (API) of an operating system. This securing may include partially restricting or terminating, via the API, any applications or processes operating on the computing device that are not consistent with a security policy.

In some embodiments, the processes for securing the device may include identifying physical conditions of the environment in which a communication device is situation to assure the physical environment is also secure. This may include monitoring the physical environment for surveillance devices, open doors or open floor plan offices that permit eavesdropping, or changes to virtual meeting attendees.

Similarly, after initiating a communication session, some embodiments may maintain a level of security by monitoring operations executed by the computing system. The system may prevent operations (e.g., applications and/or processes) not consistent with secure communication from being executed. In response to detecting an event that is not consistent with secure communication, the system may terminate or suspend an ongoing communication session or generate an alert that indicates a security policy violation.

One or more embodiments described in this Specification and/or recited in the claims may not be included in this General Overview section.

2. Architectural Overview

Figure 1A:
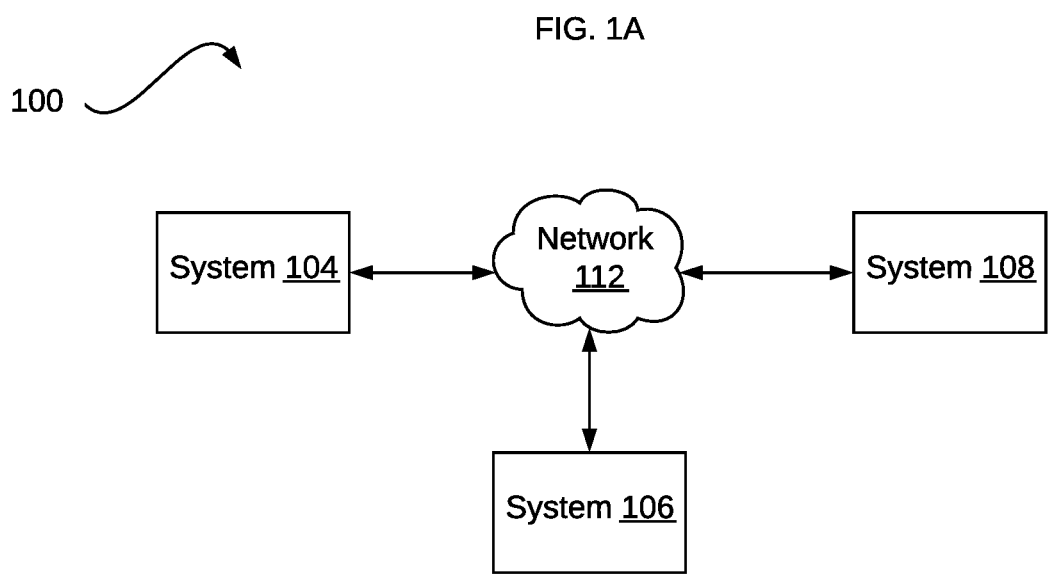
FIG. 1A illustrates a system environment for conducting secure virtual meetings in accordance with one or more embodiments.

FIG. 1A illustrates a system environment 100 in which individual systems 104, 106, and 108 may communicate with one another via a secure communication session. The details of the individual systems 104, 106, and 108 are described below in the context of FIG. 1B.

The network 112 may facilitate the secure communication between the systems 104, 106, and 108. Additional embodiments and/or examples relating to computer networks are described below in Section 6, titled "Computer Networks and Cloud Networks."

Figure 1B:
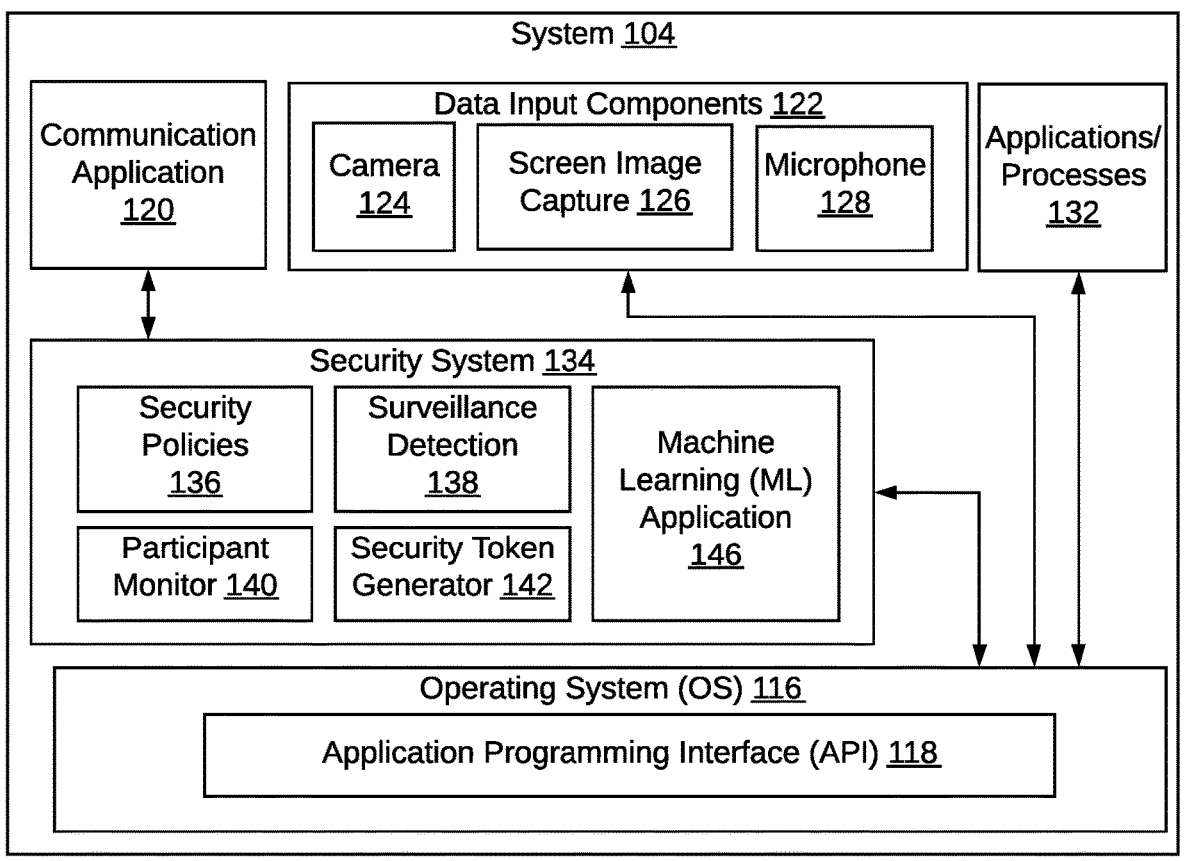
FIG. 1B illustrates a system used for establishing security for a secure virtual meeting and participating in a secure virtual meeting.

FIG. 1B illustrates a system 104 (or equivalently 106, 108) for establishing and/or participating in a secure communication session and maintaining the security for an ongoing communication session, in accordance with one or more embodiments. As described below, the system 104 establishes and maintains a secure communication session by preventing unauthorized duplication of data and monitoring a physical environment surrounding the system 104 for actions that deviate from security policies. The system 104 may prevent unauthorized duplication of data by a computing application or process executed on a system of the communication session. In some embodiments, the system 104 may prevent unauthorized duplication of data by a media capture device that is external to the system of the communication session. The system thus secures both the system associated with the communication session itself as well as the physical environment in which a system is situated.

As illustrated in FIG. 1, the system 104 may execute operations that establish and maintain an expected level of security in one or more computing devices (e.g., any one or more of systems 104, 106, 108) participating in a communication session. In one or more embodiments, the system 104 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

The system 104 includes an operating system 116 and its associated application programming interface (API) 118, a communication application 120, data input components 122, other applications and/or processes 132 and a security system 134.

The operating system 116 includes any type of systems and/or logic that, when executed, controls basic functions of the system 104. In some examples, the operating system 116 may maintain a list of computing applications and/or computing processes that are active on the system 104. In some examples, the operating system 116 may include integrated circuits (e.g., logic processors (application specific integrated circuits, central processing units, other processors), volatile memory, non-volatile memory), and executable instructions that control basic computing device functions. These functions include accessing memory devices, executing instructions, executing computing applications, executing computing processes, and scheduling tasks.

The operating system application programming interface (API) 118 is a component of the operating system 116. The OS API 118 is configured to interact directly between components, applications, and processes of the system 104 and the operating system platform 116. For example, as described below in more detail, upon the security system 134 identifying applications and/or processes that do not comply with security policies, the OS API 118 may receive the identification from the security system 134 of the offending applications and terminate them. In some examples, the operating system API 118 may directly access the data input components 122 to monitor their performance and determine whether their performance is consistent with security policies.

Other examples of the OS API 118 directly communicating with various elements of the system 100 to ensure security policies are established and maintained are described below. For example, the OS API 118 may communicate with various processes, applications, and native functions of a computing system that might otherwise be capable of duplicating data transmitted in the communication session. The OS API 118 may prevent the operation of these processes, applications, and native functions.

The communication application 120 may be any communication system that establishes a communication session with one or more participant communication systems, such as secure meeting participant 108. In some examples, the communication application 120 may establish voice communication in a communication session with another client device (e.g., system 106, 108). Example audio protocols and audio communication channels include voice over internet protocol (VOIP), session initiation protocol (SIP), the publicly switched telephone system (PTSN), and combinations thereof.

In some examples, the communication application 120 may establish video communication in a communication session with another client device. Example video protocols include real time protocol (RTP), transmission control protocol (TCP), and user datagram protocol (UDP), among others. In some embodiments, a communication session may support simultaneous video and audio transmissions.

The data input components 122 include systems by which visual data or auditory data can be received by the system 104 and stored and/or transmitted. In the example shown, the data input components 122 provided for illustration include a camera 124, a screen image capture system 126, and a microphone 128.

The camera 124 may be any type of camera that communicates with the system 104 to capture visual data external to the computing device. In some examples, the camera 124 is a light sensing integrated circuit (e.g., a complementary metal oxide semiconductor (CMOS) image sensor) and an optical lens (e.g., glass, poly(methyl methacrylate)) that may collect optical input. Once collected by the optically active components (e.g., the lens and the light sensor), the camera 124 may communicate with image processing applications operating on the system 104. In this way, optical inputs received by the camera may be communicated to the system 104 and stored in volatile and/or non-volatile memory. In various embodiments, the camera 124 may be integrated with the system 104. In other embodiments, the camera 124 may be connected to the system 104 by a cable via an appropriate input/output (I/O) port (e.g., a universal serial bus (USB) port or a display port) or by a wireless connection.

The screen image capture system 126 includes functions executed by a computing application that enables a user to select a portion of a user interface display (e.g., a screen connected to the system 104) and duplicate the selected portion. Once duplicated, the system 104 may store the selected portion of the user interface display as static image data (e.g., an image file). The process executed by the screen image capture system 126 may be referred to as a "screen shot," "screen grab," or "snap shot."

While not shown, the system 104 may include (or be in communication with) data output components for displaying visual and/or audio data. Examples of data output components include display screens, audio speakers, and the like.

As described herein, the security system 134 may terminate applications and processes that are not consistent with the secure operation of a communication session. These applications and processes that are not consistent with the secure operation of the communication session are represented in FIG. 1 as application/processes 132.

In some examples, the applications/processes 132 that are prevented from operating or are terminated (if already operating) may be native functions of the system 104 and/or a systems 106, 108. In other examples, the applications/processes 132 may be associated with functions of installed applications.

Examples of the applications/processes 132 include any applications, processes, and/or functions that may be used to duplicate or transmit data via an unauthorized channel. In some examples, applications/processes 132 include any applications, processes, and/or functions that are not directly associated with the operation of the communication application 120.

Specific examples of applications/processes 132 include screen image capture 126 processes, a clipboard (for temporarily storing visual information copied from an application or user display interface), an audio recording application, and any audio/visual communication systems other than the communication application 120 (e.g., an SMS or MMS texting application, a voice phone application, a video chat application, social media applications).

In other examples, specific examples of applications/processes 132 include text editing applications (e.g., Microsoft® Word®), internet browsers (e.g., Google® Chrome®), photo and/or image editing software (e.g., Adobe® Photoshop®), among others.

The security system 134 detects the operations of the system 104 and systems 106, 108 for compliance with security criteria before initiating a secure communication channel. Once the security system 134 establishes compliance with security criteria, the security system may transmit security credentials to approved participants via the OS API 118 and network 112.

After enabling a secure communication channel between clients (e.g., the systems 104, 106, and 108), the security system 134 may, in cooperation with the operating system 116, continue to monitor compliance of the clients with the security policies. In some examples, the security system 134 may detect a violation of a security policy and terminate the secure communication session. In other examples, the security system 134 may detect a violation of a security policy and suspend the operation of the secure communication session and/or generate an alert.

The example security system 134 shown includes security policies 136, surveillance detection system 138, a participant monitor 140, a security token generator 142, and a machine learning (ML) application 146.

The security policies 136 include stored policies that are applied by the security system 134 to communication systems and/or active communication sessions. In some examples, the security policies 136 are configured to prevent any unauthorized duplication of data transmitted through or generated within the secure communication session. As indicated above, in some examples, the security policies 136 may identify one or more applications and/or processes that are prohibited from operating (i.e., a blacklist) on a system connected to a secure communication session. In some examples, the security policies 136 may identify one or more applications and/or processes that are permitted to operate (i.e., a whitelist), such as those associated with the normal operation of the secure communication session (e.g., approved videoconference or audioconference applications).

The surveillance detection system 138 of the security system 134 may be used to detect unauthorized surveillance devices in an environment in which a secure meeting client is situated. For example, the surveillance detection system 138 may include a reflectometer that projects a light beam and detects reflections from optical lenses of concealed surveillance cameras. In some examples, the reflectometer device may be integrated with or connected to (e.g., via a USB port) systems 104, 106, 108. The reflectometer device and its associated computing application may be permitted (or even required) by the security policy 136.

In another example, the surveillance detection system 138 may include wireless communication protocol antennae to detect wireless communications. In particular, the surveillance system may detect radio frequency (RF) communications (using e.g., Bluetooth®, IEEE 802.11 protocols), RF connections, and wireless communication-enabled devices. Once identified, the surveillance system 138 may execute a packet inspection or deep packet inspection on intercepted communication packets to determine if the wirelessly transmitted packets are associated with a surveillance device. For example, wireless web cameras and wireless recorders that stream visual and/audio data to a router or device may use particular communication protocols that are associated with these types of devices. In other examples, wireless web cameras and wireless recorders may include device names, device identifiers, or other designations in packet metadata. Regardless of the type of identifying information, the surveillance system 138 may detect the presence of these devices and/or the transmission of data packets to and/or from these devices and notify the security system 134.

In some embodiments, the participant monitor 140 monitors one or more secure meeting participants (e.g., systems 106, 108) to detect whether meeting participants are complying with the security policies 136. In some embodiments, one system (e.g., system 104) may monitor itself and other systems (e.g., both of systems 106, 108) for compliance with security policies. In other embodiments, the multiple systems not only monitor themselves but also monitor at least one other system for compliance with security policies so that multiple systems monitor security compliance of the systems connected to a communication channel is secure.

For example, the participant monitor 140 of the system 104 may require the systems 106, 108 to analyze their corresponding physical environments with a reflectometer device and/or an RF detection antennae to detect the presence of unauthorized surveillance devices, as described above. The participant monitor 140 may then require secure meeting client systems 106, 108 to transmit the results of this surveillance detection operation to the participant monitor 140. This transmission enables the security system 134 of the system 104 to validate the absence of surveillance devices in the environments in which meeting participant systems 106, 108 are situated. In some examples, the participant monitor 140 may communicate directly with participant systems 106, 108 via OS API 118 and corresponding participant OS APIs to determine the results of the surveillance detection operation.

In other embodiments, the participant monitor 140 may require secure meeting participant systems 106, 108 to transmit identifiers for all active processes and/or applications. In another embodiment, the participant monitor 140 may directly detect processes and/or applications active on secure meeting participant systems via OS API 118 and corresponding participant OS APIs to directly determine whether meeting participant applications/processes are compliant with security policies.

Upon the participant monitor 140 confirming compliance of participant systems with security policies, the security token generator 142 may generate a temporary security token. The security system 134 may transmit the temporary security token to any compliant participant systems 106, 108. Once received, the participating systems 106, 108 may use the security token to indicate a corresponding approval to a security server or authentication server associated with the network 112, or other sponsor of the secure meeting.

In some examples, the temporary security token may be used to access a secure meeting at a designated time or for a designated security meeting identifier. In another example, the temporary security token may expire after a single use or after expiration of an elapsed time period.

In some examples, the security token generator 142 may also apply images transmitted through the secure meeting using steganography techniques. In these examples, the security token generator generates a steganographic identifier that is concealed in the image rendered by a system 106, 108 (e.g., on a display). While not visible in the rendered image itself, the steganographic identifier may be detected upon application of a corresponding visualization technique. This may enable a security breach, such as an unauthorized screenshot or image taken of a visual aspect of a particular communication, to be traced back to the particular communication. This in turn may be used to identify a source of the security breach.

The steganographic identifier may identify a particular communication between the system 104 and other participating systems 106, 108. For example, the steganographic identifier may encode an IP address associated with the communication, user names associated with communication participants, communication date and time, host names, or any other identifier or combination of identifiers that may be used to identify a communication. In some examples, the steganographic identifier may also be encrypted.

Any steganographic techniques may be used to conceal the steganographic identifier in an image of a communication. Examples includes embedding the steganographic identifier in an image, delaying packet transmissions to correspond to an encoded message, modifying an echo of a sound file, adding metadata to an image header, among others.

The machine learning application 146 may access video and/or audio data through the data input components in communication with the communication application 120 to detect behaviors by participants in the secure communication session that may not be consistent with secure behavior. While the details are described below in the context of FIG. 2, at a high level the machine learning application 146 may use machine learning to detect user behaviors that indicate that a user is attempting to duplicate audio or visual data presented in the secure communication session. One example of a user behavior associated with unauthorized duplication of meeting information includes a user holding up a phone to take a picture of a monitor associated with a participant system 104, 106, 108. In another example, the machine learning application 146 may detect user behaviors that indicate instability in the population of participants, such as new people entering or leaving a location at which a secure meeting is being conducted, doors in a background of a meeting room being open (or opening and closing), and the like.

In other examples, the machine learning (ML) application 146 may identify actions that are inconsistent with security policies and that might otherwise be difficult or impossible to detect using other mechanisms. For example, the ML engine 146 may be trained to identify changes to the population of participants as detected by facial recognition. Changes to the participant population may indicate an unauthorized addition to or departure from the meeting. In other embodiments, features detectable in audio and/or video streams may be associated with a user holding a mobile phone so as to record an audio or video portion of a meeting using a recording application, or take a picture of a display using a still or moving image recording application.

Upon identifying a violation of a security policy, the ML engine 146 may, via the security system 134, terminate or suspend the communication session, or notify participants of the violation as described above.

Figure 2:
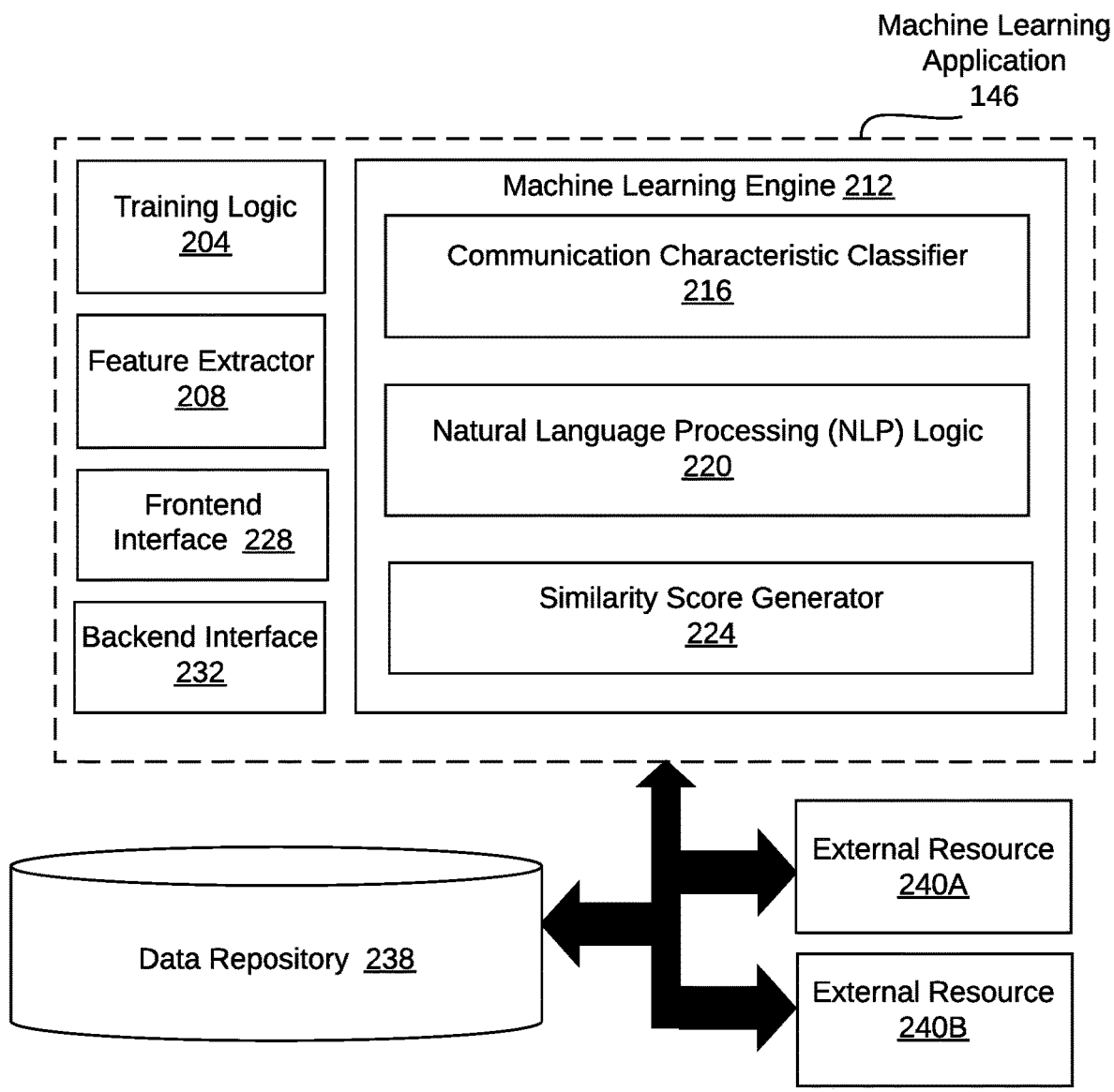
FIG. 2 illustrates an example machine learning system used for establishing and maintaining a secure virtual meeting in accordance with one or more embodiments.

Turning to FIG. 2, an example of the ML engine 146 may include a training module 204, a feature extractor 208, a machine learning engine 212, a frontend interface 234, and a backend interface 232.

In some embodiments, the training logic 204 receives a set of electronic documents as input (i.e., a training corpus). Examples of electronic documents include, but are not limited to, electronically recorded communications. In some examples, the electronically recorded conversations may include audio recordings, video recordings, or both.

A stored conversation supplied to the training logic 204 may include labels that identify participant words, phrases, actions, or other events that indicate behavior that does not comply with security policies. The labels may be associated with behaviors occurring in one or both of an audio stream or a video stream. The system may use these labeled training materials to learn secure and unsecure participant behaviors. Once trained, the machine learning model may detect these behaviors in a new, "target" communication.

The training logic 204 may be in communication with a system that is used to train the machine learning engine 212. In some examples, any one or more of the systems 104, 106, 108 may be used to train the machine learning engine 212. The user system may include an interface used by a user to apply labels to the electronically stored communications. Alternatively, labels may be applied via the system 104 contemporaneously with a target conversation. A labeled target conversation may be used by the training logic 204 to train the ML engine 212.

In some embodiments, the feature extractor 208 is configured to identify feature values and generate feature vectors from the stored audio and/or video streams of communications, described above, collectively referred to as a training corpus. The feature extractor 208 may tokenize words, phrases, or behaviors in a training corpus into vocabulary tokens or behavior tokens. The feature extractor 208 may then generate feature vectors that include a sequence of values, with each value representing a different token. Examples of feature vectors generated by the feature extractor 208 include, but are not limited to, action or term frequency feature vectors and action or term-frequency/inverse document frequency feature vectors. The labels assigned to actions, words, phrases, and/or behaviors in the training corpus documents may then be associated with corresponding feature vectors.

The feature extractor 208 may append other features to the generated feature vectors. In one example, a feature vector may be represented as $[f_1, f_2, f_3, f_4]$, where $f_1, f_2, f_3$ correspond to tokens and where $f_4$ is a non-vocabulary feature. Example non-vocabulary features may include, but are not limited to, a total duration of a communication session, an elapsed time of a communication session, detected user behaviors (e.g., entering or leaving a room mid-meeting, holding up a recording device, among others). The feature extractor 208 may optionally be applied to target communications to facilitate their analysis.

The ML engine 212 is configured to automatically learn, from the training logic 204, which portions of a communication session to transmit to other elements of the system 100 for a security intervention. Example techniques for identifying these portions of the communication session are described below in more detail.

The ML engine 212 may use the communication characteristic classifier 216 to identify participant behaviors that are not consistent (or are consistent) with a secure communication. The communication characteristic classifier 216 may be used in cooperation with other elements of the ML engine 212, such as NLP logic 220, and similarity score generator 228.

For example, the ML engine 212 may use the communication characteristic classifier 216 to identify audible or visually detectable user behaviors that violate security policies. For example, the characteristic classifier 216 may detect participants in a communication by one or both of a video stream analysis and an audio stream analysis. In the case of video stream analysis, the characteristic classifier 216 may identify the facial characteristics of the participants using facial recognition techniques. In another example, the system may identify a number of participants, and their corresponding seating locations. In the case of audio stream analysis, the characteristic classifier 216 may identify a voice signature for each participant (e.g., upon self-introductions as a start of a meeting). Any one or more of these data (e.g., faces of meeting participants, seating locations of meeting participants, a number of meeting participants, voice signatures of meeting participants) may be used by the ML engine 212 as a reference or "baseline" for the secure communication session.

Once the baseline for the communication session has been established, the communication characteristic classifier 216 in one example may continue monitoring these data in one or both of a secure audio stream and/or secure video stream. Any changes to one or more baseline data identified by the characteristic classifier 216 may signify a change in meeting participant population. This in turn may trigger a violation of a security policy and a suspension or termination of the communication session.

In still other examples, the communication characteristic classifier 216 may be trained to detect the use of unauthorized recording equipment by a participant. For example, the system, via the trained communication characteristic classifier 216, may detect a user holding up a mobile computing device (e.g. a mobile phone, a tablet computer) to take a picture of a secure communication session system display. This may correspond to an unauthorized duplication of secure communication data and cause the session to be terminated or suspended. In another example, the system may cause the session to be terminated or suspended upon detecting the mere presence of a mobile computing devices (e.g., on a table, in a participant hand).

The natural language processing (NLP) logic 220 embodies one example of a natural language processing system. The NLP logic 220 may be applied in some examples to detect participant behaviors expressed in an audio stream that do not comply with one or more security policies. For example, the NLP logic 220 may identify a communication participant stating "I'll take a picture of that" or "let me check my phone." In some situations, one or both of these statements may indicate the use of an unauthorized recording device that may suspend the communication session or trigger an alert. In other situations, the sound of a camera being actuated (e.g., a sound produced by a digital camera or phone to simulate actuation of a physical shutter assembly) may be detected and used to suspend the communication session.

In some examples, the NLP logic 220 may operate in cooperation with the feature extractor 208 to analyze an audio portion of a communication in a training corpus and/or a target communication. The NLP logic 220 may generate a vocabulary from the training corpus and then generate content vectors using a topic modeling algorithm. Examples of feature vectors commonly used in topic modeling include, but are not limited to TF-IDF, or term frequency count vectors. A set of topics may be determined for a corpus of content. Examples of topic modeling algorithms include, but are not limited to, latent Dirichlet allocation (LDA) or correlated topic modeling (CTM). It will be appreciated that other types of vectors may be used in probabilistic analyses of latent topics. The topic vectors may be used to identify content in communication sessions. In the case of communications used for training, the system may apply labels to topics identified by the topic modeling algorithm.

In some examples, the machine learning engine 212 may identify user behaviors as violating a security policy even though the identified behaviors do not exactly match labeled behaviors. This flexibility is accomplished by the similarity score generator 224. The similarity score generator 224 may compare user behaviors detected by the communication characteristic classifier 216 and/or the NLP logic 220 to labeled behaviors in a training corpus. For example, the similarity score generator 224 may receive vector representations of user behaviors (whether actions or language) in a target communication. The similarity score generator 224 may execute a similarity analysis between the received vector representations and vector representations of corresponding behaviors in a training corpus. The similarity score generator 224 may generate a similarity score (e.g., by a cosine similarity computation) to determine whether behaviors in the target communication are sufficiently similar (e.g., above a similarity threshold value) to labeled behaviors in a training corpus to warrant a security action. For example, a similarity analysis may prompt the system to suspend a communication session when a participant says "I'll snap that" even though the training corpus does not include this phrase but instead includes a labeled training communication in which a user states "I'll take that picture."

Frontend interface 228 manages interactions between the system 104 and the ML application 146. For example, the system 104 may submit requests to perform various functions and view results through frontend interface 228. In various examples, the system 104 may include another application through which requests are submitted, such as a shell or client application. In some examples, the frontend interface 228 may be an interface used by a user operating the system 104 to participate in a secure communication session.

In some embodiments, frontend interface 228 is a presentation tier in a multitier application. Frontend interface 228 may process requests received from systems and translate results from other application tiers into a format that may be understood or processed by the systems. Frontend interface 228 may be configured to render user interface elements and receive input via user interface elements. For example, frontend interface 228 may generate webpages and/or other graphical user interface (GUI) objects. Client applications, such as web browsers, may access and render interactive displays in accordance with protocols of the internet protocol (IP) suite. Additionally or alternatively, frontend interface 228 may provide other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

Backend interface 232 may include an API, CLI, or other interfaces for invoking functions to execute actions. One or more of these functions may be provided through cloud services or other applications, which may be external to the system 104. For example, one or more components of system 104 may invoke an API to access information stored in data repository 238 for use as a training document for the machine learning engine 212. As another example, an API in the backend interface 232 may access communication systems used by users to analyze one or more of an audio stream and/or a video stream for compliance with security policies. It will be appreciated considering these examples that the actions that are performed may vary from implementation to implementation.

In one or more embodiments, a data repository 238 may be used to store various data items used by the system 104 and/or the ML application 146. For example, the data repository 238 may store a training corpus, user profiles, product data, portions of audio streams, portions of video streams, security profiles and data, among other types of data. The data repository 238 may be any type of storage unit and/or device (e.g., a file system, database, collection of tables, or any other storage mechanism) for storing data. Further, a data repository 238 may include multiple different storage units and/or devices. The multiple different storage units and/or devices may or may not be of the same type or located at the same physical site. Further, a data repository 238 may be implemented or may execute on the same computing system as the system 104. Alternatively or additionally, a data repository 238 may be implemented or executed on a computing system separate from the system 104. A data repository 238 may be communicatively coupled to one or both of the system 104 via a direct connection or via a network.

In some embodiments, the system 104 may access external resources, such as cloud services. Example cloud services may include, but are not limited to, social media platforms, email services, short messaging services, enterprise management systems, verbal communication systems (e.g., internet based voice communications, text chat communications, PTSN communications systems) and other cloud applications. Backend interface 232 may serve as an API endpoint for invoking a cloud service. For example, backend interface 232 may generate outbound requests that conform to protocols ingestible by external resources. Backend interface 232 may process and translate inbound requests to allow for further processing by other components of the system 104. The backend interface 232 may store, negotiate, and/or otherwise manage authentication information for accessing external resources. Example authentication information may include, but is not limited to, digital certificates, cryptographic keys, usernames, and passwords. Backend interface 232 may include authentication information in the requests to invoke functions provided through external resources.

In one or more embodiments, interfaces 228, 232 refer to hardware and/or software configured to facilitate communications between a user and one or more of the systems 104, 106, 108. Interfaces 228, 232 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interfaces 228, 232 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interfaces 228, 232 are specified in one or more other languages, such as Java, C, or C++.

In one or more embodiments, a data repository 238 is any type of storage unit and/or device (e.g., a file system, database, collection of tables, or any other storage mechanism) for storing data. Further, a data repository 238 may include multiple different storage units and/or devices. The multiple different storage units and/or devices may or may not be of the same type or located at the same physical site. Further, a data repository 238 may be implemented or may execute on the same computing system as the system 104. Alternatively or additionally, a data repository 104 may be implemented or executed on a computing system separate from the system 104. A data repository 104 may be communicatively coupled to the system 104 via a direct connection or via a network.

One or more embodiments described herein may refer to hardware and/or software configured to perform operations described herein for establishing and maintaining a physically and electronically secure communication session. Examples of operations for establishing and maintaining a secure communication session are described below with reference to FIGS. 3 and 4.

In an embodiment, the systems 104, 106, 108 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Securing a Communication Session Prior to Initiation

Figure 3:
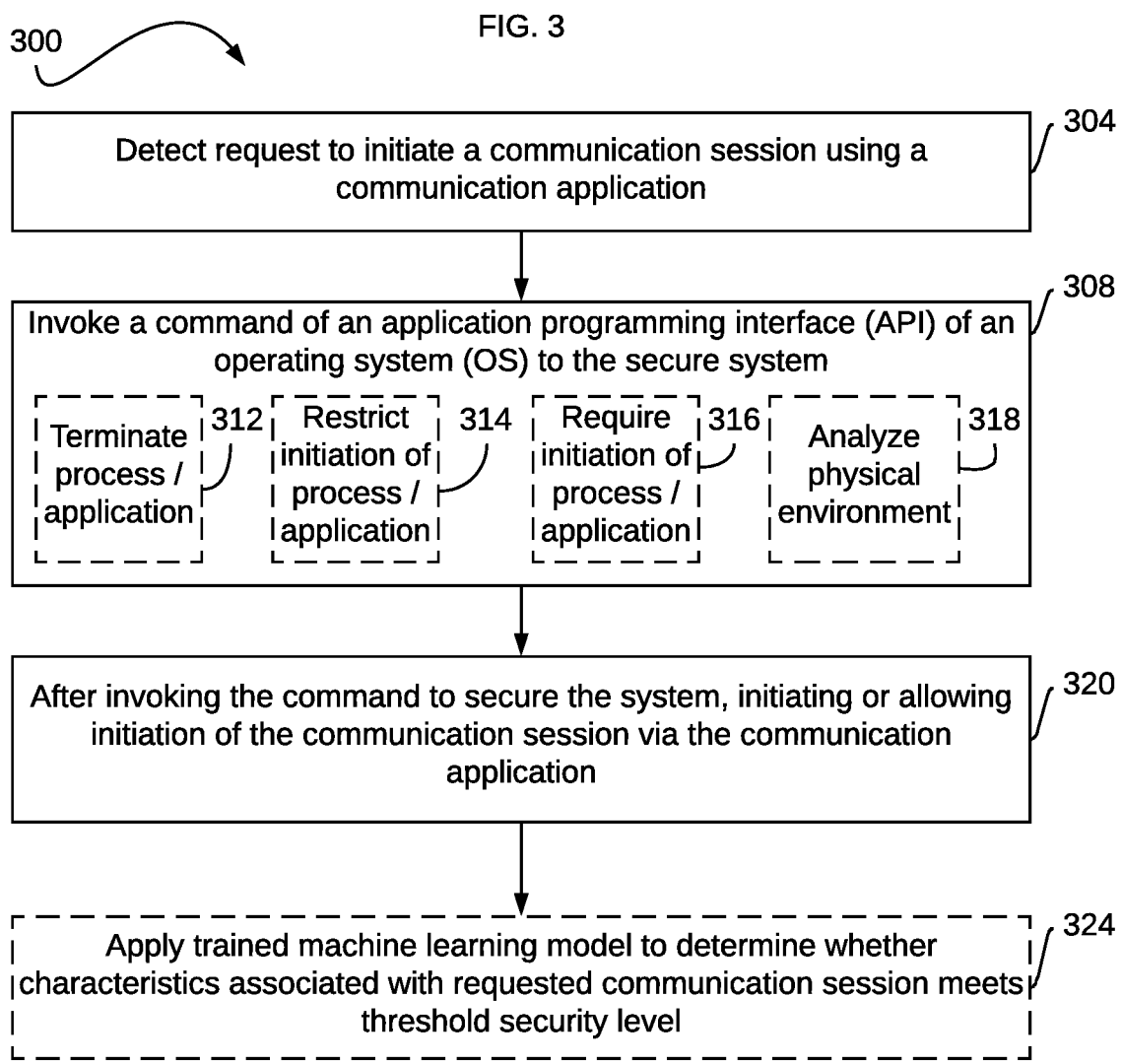
FIG. 3 illustrates an example set of operations for securing a virtual meeting prior to initiating the virtual meeting in accordance with one or more embodiments.

FIG. 3 illustrates an example set of operations in a method 300 for establishing a secure communications session in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

The method 300 may begin by detecting a request to initiate a communication session using a communication application (operation 304). Examples of communication applications include those using one or more of the protocols described above. Generally, communication applications may establish a communication session using one or both of an audio stream and a video stream.

In response to detecting the request to initiate the communication application, the system may invoke one or more commands of an application programming interface (API) of the operating system (OS) to secures operating system of the device (e.g., system 104) prior to establishing the secure communication session (operation 308). Invoking commands of the API OS improves the operation of the system by avoiding the use of command lines transmitted between applications, which may be intercepted and/or inhibited by features of some applications (e.g., malicious code and/or unsecure applications). In this way, the system may apply an additional layer of security by reducing the opportunity for malicious actors to prevent the system from being secured. In some examples, the system may also confirm that the operating system and/or its security features are in an up-to-date or "current" state. That is, the system may confirm that the operation system and/or its security features include updates, patches, or security features that may have been issued in updates from the OS architects after installation of the OS on the computing device. In some cases, the system may refer to an OS source website or electronically accessible resource to confirm that an OS version operating on the computing device is the version listed on the OS source website as a current version. In other situations, the system may confirm that a most recent security update listed on the OS source website has been installed and is operating on the computing device. The system may confirm the current state of one or both of the operation system as a whole and/or the security features of the OS prior to initiating or allowing initiation of the communication session.

In some examples, the system, via the API may select from different security levels and transmit different sets of commands corresponding to a particular security level selected from the different security levels. In one example, the system may select a first, lower level of security. In this situation, the API may transmit instructions to secure the system in a way that does not require a visual media capture device (e.g., a webcam), but engages other functions that require meeting attendees to validate their identity and confirm that a location is secure. The system may monitor an audio stream to determine whether unauthorized activities have occurred (e.g., unauthorized attendee voices, doors opening or closing, sounds associated with the operation of mobile computing devices). In another example, the system may select a second, high level of security. In this situation, the API may transmit instructions that require both audio and visual streams to be captured and monitored using techniques described herein.

In an alternative example, some embodiments of a communication application (e.g., the communication application 120) may be presumed to be secure. For example, a communication application may be installed on a trusted device (e.g., a server separate from a user communication system) that operates a secure local client of a user device. In another example, a communication application may be installed in a way in which security is preserved on a user system. Regardless, a secure communication application may operate with administrator permissions for an operating system of the communication system (e.g., communication system 104). With administrator level permission, the communication application may make native operating system calls. In this way, the communication application may itself secure a user system using OS API calls and avoid the use of commands that are less secure. In some examples, the secure communication application may use ActiveX controller functions to make the OS API calls described above.

To secure the system, the OS API calls may limit a variety of system operations. In some examples, the OS API calls may terminate processes and/or applications actively operating on the system (operation 312). In some examples, the OS API calls may restrict or prevent processes and/or applications from initiating on the system (operation 314). For example, the OS API calls may terminate or disable processes or applications that provide user notifications, operate audio/visual recording or image capture applications, or enable communications outside of the secure communication application (e.g., other VOIP applications, video conference applications). In some examples, the OS API calls may empty volatile memory systems (e.g., a cache memory) to prevent any resident malicious processes from being accessed. In some examples, the OS API calls may disable volatile memory systems thereby preventing any improperly duplicated data from being stored locally during a secure meeting.

In still other examples, the OS API calls may require that some processes and/or applications be initiated and/or maintained as a condition for the secure communication session (operation 316). For example, some OS API calls may require that video cameras associated with systems connected to the secure communication session be active during the entire duration of the secure communication session. In some examples, explained below, this may enable systems to monitor a population of participants and detect any unauthorized changes to participants.

In some examples, the OS API calls may require an authorized audio and/or video capture device (e.g., a microphone, a video camera) to be connected to a system maintaining the secure communications session. For example, participants may be required to use pre-approved or otherwise designated audio and/or video capture devices that meet security criteria, such as using firmware not susceptible to surveillance. In some examples, OS API calls may detect whether an approved (i.e., whitelisted) device is connected to a physical input/output port (e.g., a USB port) or an approved virtual port. In other examples, the system may detect a wirelessly connected audio and/or video capture device. The system may detect a corresponding exchange of security tokens between the system and the audio and/or video capture device that validate an approved security status of the connected device.

In some examples, the OS API calls may require an analysis of the physical environment in which a communication system is situated to determine whether unauthorized attendance of the session and/or unauthorized duplication of data transmitted in the session is possible. In one example, the OS API call may require the system to identify detectable wireless data transmission signals (e.g., those associated with IEEE 802.11 protocols). This may be accomplished using the transceivers integrated with the system itself and used by the system for wireless communications (e.g., detecting accessible wireless networks). In some examples, detected wireless transmissions may be inspected to determine a protocol used to encode data in the transmitted packets. For example, packets encoded with protocols used to encode image detected by a wireless video camera or wireless microphone may be detected. Detecting the use of these types of protocols may in turn generate an alert to users or otherwise prevent initiation of the communication session until the transmissions are terminated (indicating the wireless devices are no longer recording information from the environment).

In some examples, the OS API call may involve the connection of a separate analytical device to the system that is used to detect unauthorized audio and/or recording systems. For example, as described above, a detector may be connected to the system to project a light beam and detect reflections from optical lenses of concealed surveillance cameras. The separate analytical device may be a whitelisted device (e.g., based on a media access control identifier, serial number, or other identifier) and/or itself be secured using an exchange of security tokens between the analytical device and the system. Similar approved secure devices may be connected to detect wireless surveillance transmissions.

After the system invokes one or more OS API calls to secure the system, the system then initiates (or allows initiation of) a secure communication session via the communication application (operation 320). As described above, the secure communication session may include using VOIP, SIP, RTP or any other similar audio and/or visual communication protocol.

In some examples, a trained machine learning model may be used to determine whether characteristics associated with the communication session meet security policies (operation 324). Techniques for training the machine learning model are described above in the context of FIG. 1. At a high level, the machine learning may be trained using data associated with one or more historical communication sessions that have been labeled with a security level that either meets (or exceeds) a threshold security level needed for secure communications or does not meet the threshold security level.

In some examples, the trained machine learning model may be used to evaluate a security level associated with the (target) secure communication session (operation 324). In some examples, the trained machine learning model may determine a security level based on one or more attributes associated with the secure communication session and also present in the historical communication session data. For example, after being trained, the machine learning model may identify the presence and/or absence of computing applications and/or processes that are not permitted. Analogously, the machine learning model may identify the presence and/or absence of computing applications and/or processes that are required for the secure operation of the communication session. Examples of these processes/application are described above. However, unlike the preceding description which uses the identification of these processes/application to strictly determine whether or not to permit the communication session, the trained machine learning model may collectively analyze these attributes to determine an overall security level.

Other attributes include identifying any connected peripheral devices for their corresponding impact to the security level. For example, external wireless keyboards, mobile communication devices paired with a system operating the secure communication system, or other connected wireless devices may be associated with a security level determined by the trained machine learning model. In some examples, the mere presence of some computing applications on a system, whether operating or not, may affect a security score generated by the trained machine learning model. For example, several computing applications may, collectively, be identified by the trained machine learning model as degrading security of a system so that the system does not meet a threshold security level. However, the presence of only one of these computing applications may, on its own, not degrade a system security level below the threshold security level.

In some examples, the characteristics detectable by the trained machine learning model may include those associated with physical conditions in an environment in which a secure communication application system is situated (operation 324). The machine learning model may be trained to associate these characteristics with breaches in security. Because some of these characteristics may involve the use of audio/visual input/output devices, the operation 324 may be executed after initiation of the secure communication session and the associated activation of audio/visual input/output devices. However, this need not be the case. In other embodiments, the operation 324 may be executed by engaging audio/visual input/output devices, evaluating characteristics captured by the devices using the machine learning model, and then subsequently initiating (or not initiating) the secure communication session.

In some examples, the machine learning model detects physical features in video input of one or more secure communication session systems to determine whether the surrounding environment is secure. For example, the trained machine learning model may identify the presence of open windows and/or open doors in an environment surrounding a secure communication session system. These may be associated with a lack of security due to eavesdropping and/or an inability to restrict attendance to a meeting. Similarly, the trained machine learning model may identify surroundings associated with an open floor plan office (e.g., cubicle walls, partial walls, a high level of background audio noise). Upon detecting any of these features, the system may prevent the initiation of the communication session.

In some examples, the trained machine learning model may detect characteristics in audio and/or visual data that are associated with participants themselves. For example, the trained machine learning model may detect participant actions that are associated with unauthorized duplication of data transmitted in the secure communication session. Examples of participant actions include holding a mobile communication device in a position to capture visual data (e.g., using an integrated camera feature) from a display of a secure communication system. In some examples, the system may detect the presence of any mobile communication device, whether in a hand, on a table, or anywhere in view and take actions to secure the meeting. In some examples, the machine learning model may detect audio data that suggests unauthorized duplication of data transmitted in the secure communication session. Participant expressions like "let me take a picture," or "can you say that again so I can record it" may be detected by the machine learning application.

Any one or more of these examples may trigger a corresponding action. Alternatively, these actions may be scored and used to determine whether a threshold security level is met or not met, in combination with other factors described above.

In some examples, the trained machine learning model may not only identify applications and processes that impact a threshold security score, but also terminate any applications and/or processes that cause the system to have a security level value below a threshold. For example, the trained machine learning model may identify two applications capable of capturing screen images and a third application for transmitting data wirelessly to a paired device (e.g., a local radio frequency transmitter radio, such as via Bluetooth®). The machine learning model may, based on its training, identify the transmission application as having the most significant security risk and the largest negative impact to a security score. The trained machine learning model may then cause deactivation and inhibit reactivation of the transmission application, bring the security score of the system to exceed or meet the security threshold.

Other applications of a trained machine learning model are described below in more detail.

4. Monitoring a Communication Session to Maintain a Secure Environment

Figure 4A:
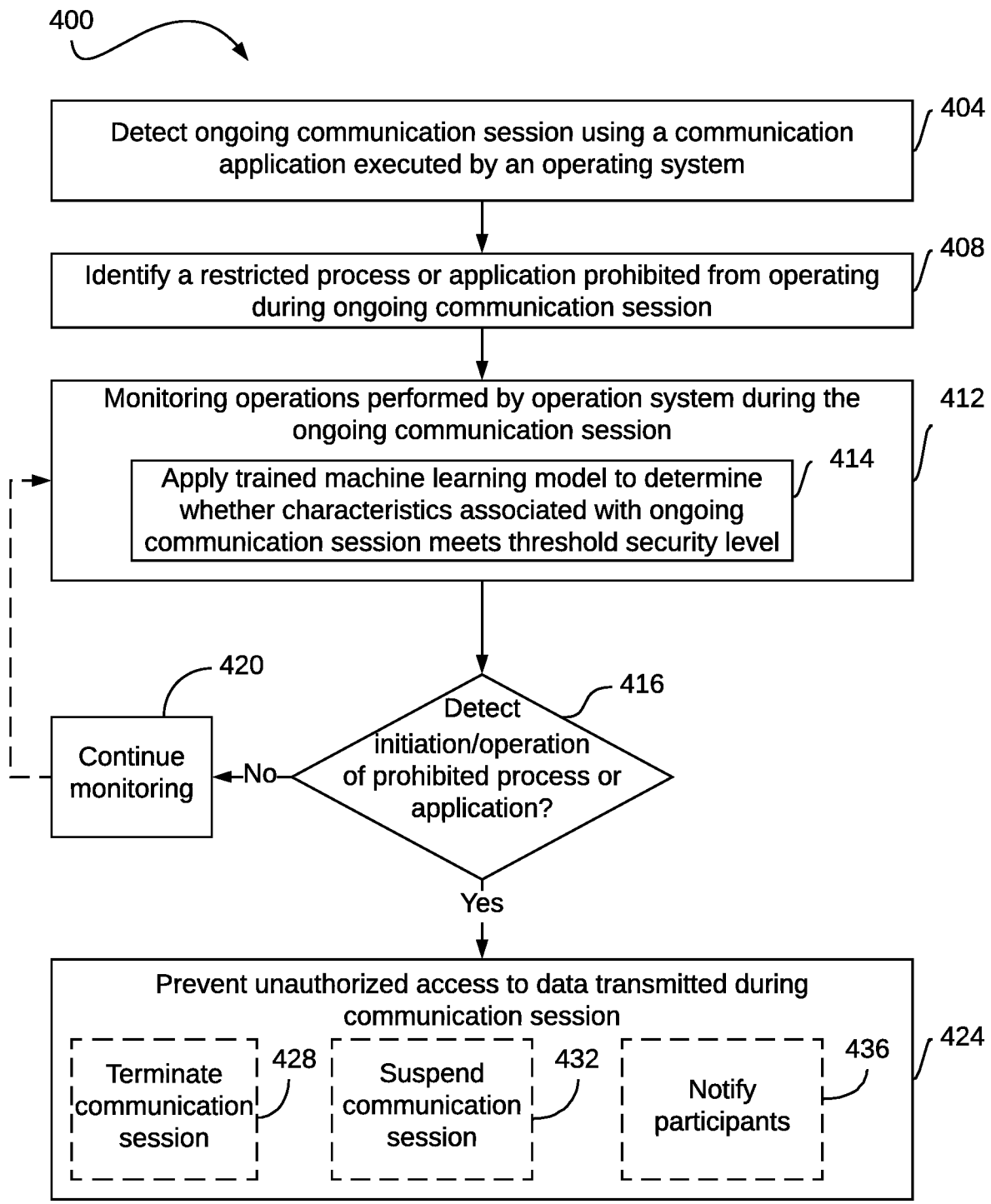
FIG. 4A illustrates an example set of operations for detecting a non-secure event during a virtual meeting and suspending or terminating the virtual meeting in response to the detection in accordance with one or more embodiments.

FIG. 4A illustrates an example set of operations for monitoring a security status of an active secure communication session in accordance with one or more embodiments. The system may, in response to the monitoring, detect activation, initiation, and/or operation of any processes and/or applications that violate security policies or are otherwise restricted. One or more operations illustrated in FIG. 4A may be modified, rearranged, or omitted all together. Accordingly, the particular sequence of operations illustrated in FIG. 4A should not be construed as limiting the scope of one or more embodiments.

The method 400 may begin by detecting or identifying an ongoing secure communication session (operation 404). In some examples, as described above, the communication session may be enabled using a secure communication application that is executed by an operating system of an associated device. The system may detect the ongoing secure communication session by, for example, detecting transmissions to and from the secure communication application, packets generated by the secure communication application, packets encoded using a protocol associated with the secure communication application, among other techniques. In some examples, the system may simply detect active processes associated with the secure communication application.

The system may also identify one or more restricted processes that are prohibited from operating during an ongoing communication session (operation 408). As described above, these prohibited operations and/or processes may enable unauthorized duplication or unauthorized transmission of data transmitted in the secure communication session. Examples of these restricted operations and/or processes are described above and include monitoring applications and/or processes executed by the system itself as well as the surrounding physical environment. In some examples, the system may store identifiers associated with restricted operations and/or processes may in a blacklist. In some examples, the system may store a white list of permitted operations and/or processes and assume that any operations and/or processes not on the whitelist are restricted.

The system may monitor system operations performed during the ongoing communication session to determine whether any restricted operations/processes are initiated or active during the secure communication session (operation 412). As part of the monitoring, the system may compare active processes and/or applications against the blacklist. For example, the system may compare a list of active processes to the blacklist periodically (e.g., every 5 seconds, every 30 seconds, every 1 minute) to identify matches therebetween. In another embodiment, the system may identify events associated with a newly initiated process and/or application and compare identifiers associated with the newly initiated processes/applications to the blacklist.

In some examples, a trained machine learning model may monitor system operations, monitor participant actions and/or a physical environment in which a secure communication session system is situated for characteristics that indicate compromised security. Examples of participant actions and/or a physical environment characteristics that may alter a security score of a secure communication session are described above in the context of operation 324.

Based on the monitoring, the system may detect whether any restricted operations/processes are initiated or operating during the ongoing communication session (operation 416). If the system does not detect restricted operations/processes, then the system continues the monitoring (operation 420). However, if the system does detect the initiation or operation of any restricted processes, then the system may execute operations to secure the communication session and prevent unauthorized duplication of data or unauthorized access to data (operation 424).

The system may prevent unauthorized access to data transmitted during the ongoing communication session (operation 424). The system may prevent this unauthorized access in any number of ways. In one example, the system may terminate the communication session upon detecting a restricted operation/process (operation 428). That is, the operating system API may call the secure communication application to force termination of the application. Other similar actions may be executed by the operating system API. For example, power system operating may be terminated.

In another embodiment, the system may prevent unauthorized access by temporarily suspending the ongoing communication session (operation 432). In this example, the system may call audio/visual input/output devices and terminate their associated processes and/or applications. In addition, the system may optionally alert participants of an unauthorized process. This allows participants to resolve the unauthorized process so that the communication session may continue.

In still another embodiment, the system may notify participants of a restricted operation (operation 436). For example, the system may maintain some operation of the secure communication channel and notify participants with an audio signal or a visual signal (e.g. a splash screen) that alerts the participants of the restricted operation.

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 4B:
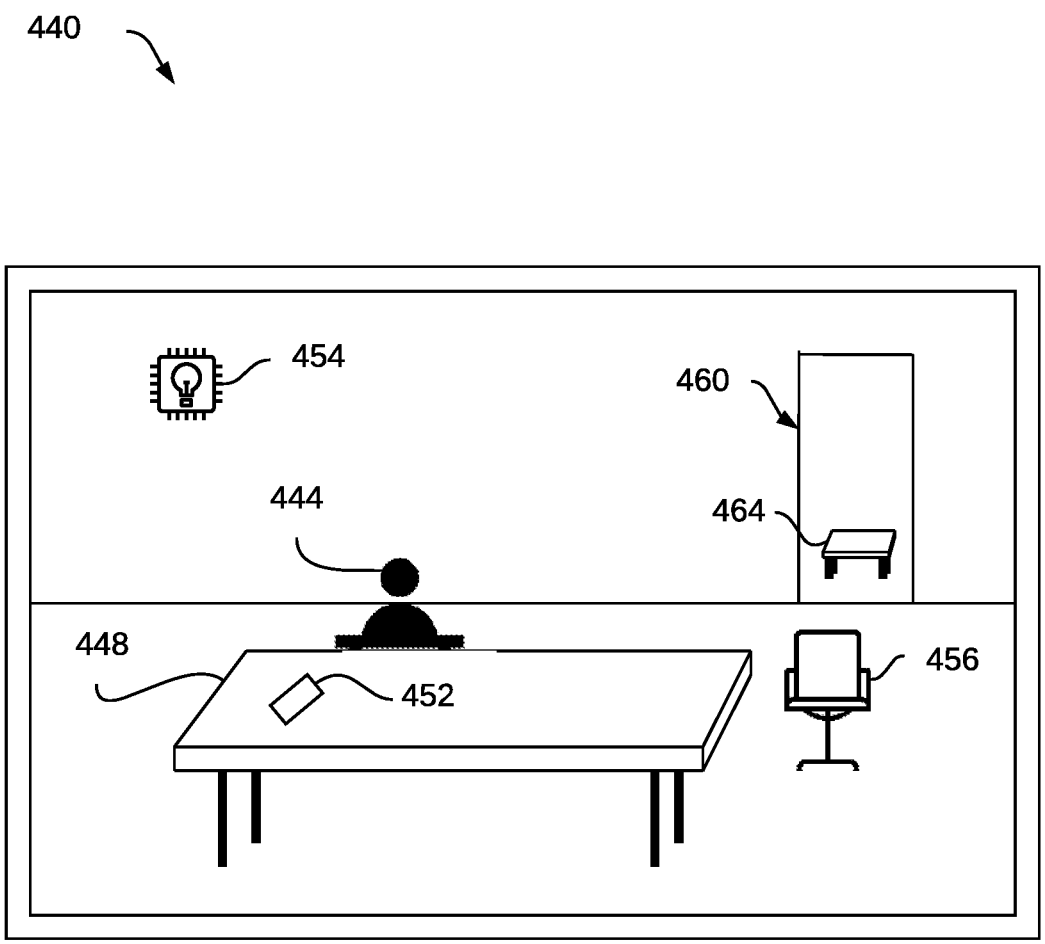
FIG. 4B illustrates an example embodiment in accordance with one or more embodiments.

FIG. 4B illustrates an example frame 440 from a video stream analyzed by a trained machine learning model to detect user behaviors that are not consistent with secure communication. As shown in the rendered video frame 440, a virtual meeting participant 444 is seated at a conference table 448. Also visible, and therefore detectable, in the rendered video frame 440 is a mobile phone 452 on the conference table 448, a light 454, an empty chair 456, and an open doorway 460 through which a desk 464 is visible.

As described above, the system may detect any one or more of the features in the frame 440 that indicate a possibility that data transmitted in the secure communication session may be duplicated without authorization. For example, the presence of the mobile computing device 452 on the conference table 448 may be sufficient for the system to terminate or suspend the communication session or generate an alert. As explained above, this is because the mobile computing device 452 may improperly record audio or visual data from the communication session.

In another example, an analytical device connected to the system that is capturing the frame 440 may project a light beam to detect a lens of an unauthorized surveillance camera concealed by the light 454. A similar approach may be used to detect wireless transmissions from the unauthorized surveillance camera concealed by the light 454. In response to detecting a concealed surveillance device, the system may prevent a communication from being initiated, suspend the communication session, and/or generate an alert.

Similarly, the presence of the empty chair 456 and/or the open doorway 460 suggest the possibility of fluctuations in the attendees of the secure communication session and/or an ability for an unknown party to eavesdrop on the secure communication session. Regardless, one or more of these physical aspects suggest a physical environment that is insufficiently secure. As a result, the system may terminate or suspend the communication session or generate an alert indicating that these issues must be resolved before proceeding with an exchange of data.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
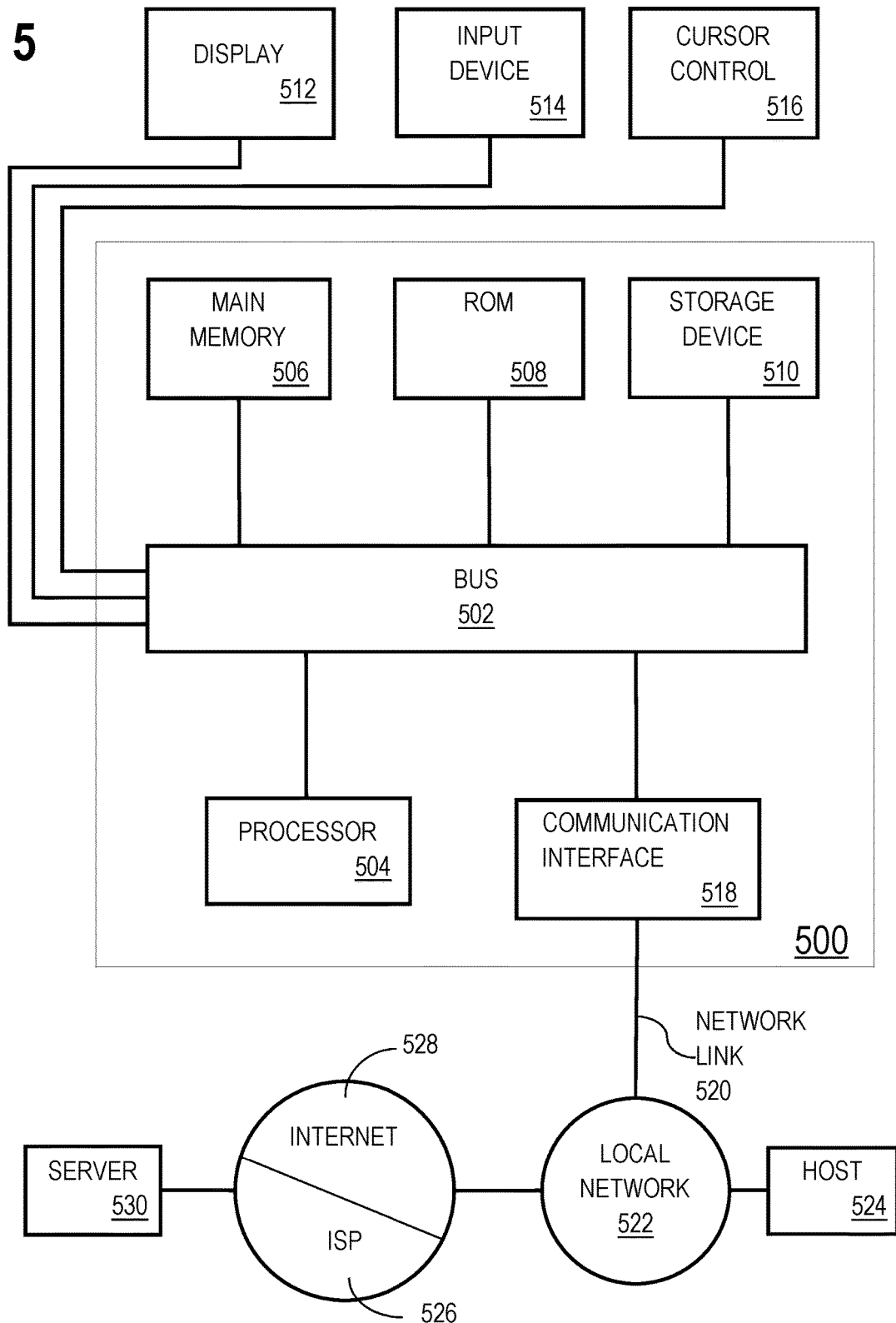
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause performance of operations comprising:
    detecting a request to initiate a communication session corresponding to a first application being executed by an operating system;
    responsive to detecting the request and prior to initiation of the communication session, invoking a command from an application programming interface (API) of the operating system that (a) identifies at least one of a first process, a second process, a second application, and a third application, and (b) secures the operating system by performing one or more of:
        terminating the first process being executed by the operating system that is not permitted to execute during the communication session;
        restricting initiation, by the operating system, of execution of the second process that is not permitted to execute during the communication session;
        terminating the second application being executed by the operating system that is not permitted to execute during the communication session;
        restricting initiation, by the operating system, of execution of the third application that is not permitted to execute during the communication session; and
    subsequent to invoking the command from the API of the operating system that secures the operating system:
        initiating or allowing the initiating of the communication session corresponding to the first application.

2. The media of claim 1, wherein invoking the command to secure the operating system is further responsive detecting that the communication session is associated with a level of security that meets a threshold level of security.

3. The media of claim 2, further comprising determining a level of security for the communication session using a trained machine learning model, wherein the determining comprises:
    training the machine learning model to determine the level of security at least by:
        obtaining historical data comprising one or more communications sessions in which a plurality of corresponding communication session characteristics are associated with a level of security that meets a threshold level of security;
        generating a training set comprising the one or more communications sessions associated with the plurality of corresponding communication session characteristics and the level of security that meets the threshold level of security;
        training the machine learning model with the plurality of communication session characteristics with the threshold level of security;
    applying the trained machine learning model to the communication session corresponding to the first application;
    responsive to the applying, determining, based on the trained machine learning model, that a set of communication session characteristics associated with the communication session corresponding to the first application meets the threshold level of security; and
    invoking the command of the application programming interface (API) of the operating system is further in response to determining that the communication session corresponding to the first application meets the threshold level of security.

4. The media of claim 3, wherein the plurality of communication session characteristics comprise one or more of:
    an absence of computing applications executing on a communication device associated with the communication session other than computing applications associated with the communication session; and
    an absence of computing processes executing on the communication device associated with the communication session other than computing processes associated with the communication session.

5. The media of claim 1, wherein invoking the command of the application programming interface (API) comprises identifying one of the first process, the second process, the second application or the third application based on an association with a level of security associated with the communication session.

6. The media of claim 1, wherein invoking the command of the application programming interface (API) of the operating system further comprises causing one or more media input devices to remain active during the communication session.

7. The media of claim 6, further comprising:
    detecting deactivation or inactivity of one or more of the media input devices; and
    responsive to the detecting operation, invoking a command of the application programming interface (API) of the operating system that terminates the first application.

8. The media of claim 1, wherein invoking the command of the application programming interface (API) of the operating system further comprises:
    detecting communication with a media capture device for use with the communication session;
    determining that the media capture device is an authorized media capture device permitted for secure use with the communication session; and
    subsequent to determining that the media capture device is permitted for secure use, initiating or allowing the initiating of the communication session corresponding to the first application.

9. The media of claim 1, further comprising, prior to initiating or allowing the initiating of the communication session corresponding to the first application, determining that a security state of the operating system comprises a current version of the operation system.

10. One or more non-transitory computer-readable storage media storing instructions, which when executed by one or more hardware processors, cause performance of operations comprising:
    detecting an ongoing communication session corresponding to a first application executed by an operating system;
    responsive to detecting the ongoing communication session:
        identifying at least one restricted operation that is not permitted to be executed during the ongoing communication session;
        monitoring a set of operations being performed by the operating system, during the ongoing communication session corresponding to the first application, to determine whether any of the set of operations comprise the at least one restricted operation;

responsive to determining that the set of operations being performed during the ongoing communication system by the operating system comprise the at least one restricted operation, executing, by an application programming interface (API) of the operating system, at least one of:

invoking a first command to terminate the ongoing communication session; and invoking a second command to pause the ongoing communication session.

11. The media of claim 10, wherein terminating the ongoing communication session and pausing the ongoing communication session are executed by invoking a command of the application programming interface (API) of the operating system.

12. The media of claim 10, wherein the at least one restricted operation comprises identifying, via a video stream associated with the ongoing communication session, one or more of a mobile computing device in an image frame of the video stream and an image of a camera lens of a mobile communication device in the image frame of the video stream.

13. The media of claim 10, wherein the at least one restricted operation comprises:

executing a computing application on a communication device associated with the communication session other than a computing application associated with the communication session; and executing a computing process on the communication device associated with the communication session other than a computing process associated with the communication session.

14. The media of claim 10, further comprising determining a level of security for the communication session using a trained machine learning model, wherein the determining comprises:

training the machine learning model to determine the level of security at least by:

obtaining historical data comprising one or more communications sessions in which a plurality of corresponding communication session characteristics are associated with a level of security that meets a threshold level of security;

generating a training set comprising the one or more communications sessions associated with the plurality of corresponding communication session characteristics and the level of security that meets the threshold level of security;

training the machine learning model with the plurality of communication session characteristics with the threshold level of security;

applying the trained machine learning model to the communication session corresponding to the ongoing communication session; and responsive to the applying, determining, based on the trained machine learning model, that a set of communication session characteristics associated with the ongoing communication session corresponds to a restricted behavior; and responsive to the determining, terminating the ongoing communication session.

15. The media of claim 10, further comprising invoking a command of the application programming interface (API) of the operating system causing one or more media input devices to remain active during the communication session.

16. The media of claim 15, further comprising:

detecting deactivation or inactivity of one or more of the media input devices; and responsive to the detecting operation, invoking a command of the application programming interface (API) of the operating system that terminates the ongoing communication session.

17. One or more non-transitory computer-readable storage media storing instructions, which when executed by one or more hardware processors, cause performance of operations comprising:

detecting a request to initiate a communication session for a virtual meeting corresponding to a first application being executed by an operating system, the operating system executing on a device in a particular physical environment;

responsive to detecting the request and prior to initiation of the communication session, invoking a command from an application programming interface (API) of the operating system to secure the operating system by preventing the initiation of the communication session upon identifying, within the particular physical environment, to be used for the virtual meeting, a presence of one or more of:

a concealed surveillance device;

a recording device; and a physical opening that provides access to the physical environment.

18. The media of claim 17, further comprising, responsive to the analyzing operation:

detecting the presence of one or more of the concealed surveillance device, the recording device, and the physical opening; and responsive to detecting the presence of one or more of the concealed surveillance device, the recording device, and the physical opening, preventing initiation of the communication session.

19. The media of claim 18, wherein the concealed surveillance device, the recording device, and the physical opening are detecting in a video signal of the communication session corresponding to the first application.

20. The media of claim 19, further comprising, responsive to the analyzing operation:

detecting an absence of one or more of the concealed surveillance device, the recording device, and the physical opening; and responsive to detecting the absence of one or more of the concealed surveillance device, the recording device, and the physical opening, permitting initiation of the communication session.

21. The media of claim 19, further comprising continuing to analyze the physical meeting environment during the communication session for the presence of one or more of the recording device and the physical opening.

22. The media of claim 17, wherein the analyzing operation comprises detecting a recording device using a trained machine learning model, wherein the detecting comprise training the machine learning model to detect a presence of a recording device at least by:

obtaining historical data comprising one or more communications sessions in which a presence of a recording device is detectable in video data or audio data;

generating a training set comprising the one or more communications sessions associated with the presence of the recording device;

training the machine learning model with training set;

applying the trained machine learning model to the communication session corresponding to the first application;

responsive to the applying, determining, based on the trained machine learning model, that a recording device is present in communication session corresponding to the first application; and preventing the communication session from being initiated.

23. The media of claim 17, wherein analyzing the particular physical environment comprises analyzing an image of the particular physical environment that was captured subsequent to detecting the request.

\* \* \* \* \*

UNITED STATES PATENT AND TRADEMARK OFFICE
CERTIFICATE OF CORRECTION

PATENT NO. : 11,811,827 B2
APPLICATION NO. : 17/160753
DATED : November 7, 2023
INVENTOR(S) : Anantharaju It is certified that error appears in the above-identified patent and that said Letters Patent is hereby corrected as shown below:

In the Specification

In Column 4, Line 22, delete "PTSN" and insert -- PSTN --, therefor.

In the Claims

In Column 25, Line 40, in Claim 2, delete "responsive" and insert -- responsive to --, therefor.

Signed and Sealed this
Twenty-fifth Day of June, 2024

Katherine Kelly Vidal
*Director of the United States Patent and Trademark Office*